No. 831,095. PATENTED SEPT. 18, 1906.
J. C. POLSON.
PLUMBER'S CLAMP.
APPLICATION FILED AUG. 3, 1905.
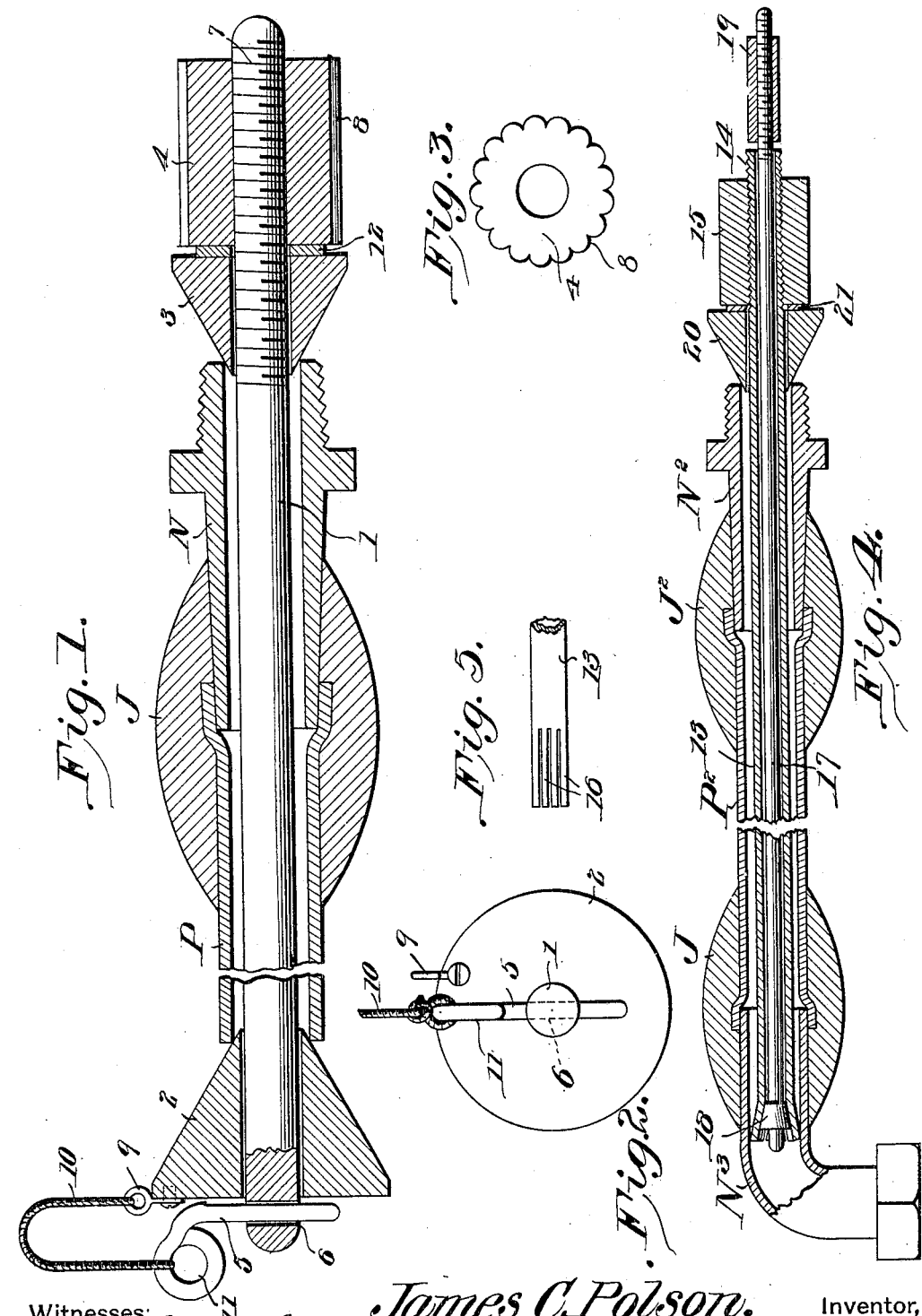
James C. Polson, Inventor,
by C. A. Snow & Co.
Attorneys.

UNITED STATES PATENT OFFICE.

JAMES C. POLSON, OF CENTRALIA, ILLINOIS.

PLUMBER'S CLAMP.

No. 831,095.　　　　　Specification of Letters Patent.　　　　Patented Sept. 18, 1906.

Application filed August 3, 1905. Serial No. 272,583.

*To all whom it may concern:*

Be it known that I, JAMES C. POLSON, a citizen of the United States, residing at Centralia, in the county of Marion and State of Illinois, have invented a new and useful Plumber's Clamp, of which the following is a specification.

This invention relates to plumbers' clamps used in making wipe-joints.

The object of the invention is to provide a simple and novel form of clamp which shall be adapted for use in connecting straight sections of pipe or a section of pipe to a nipple or a straight section of pipe to a curved nipple, the parts of the implement being so constructed and assembled as practically to preclude danger of derangement in use and to secure the highest efficiency in operation.

With the above and other objects in view, as will appear as the nature of the invention is better understood, the same consists in the novel construction and combination of parts of a plumber's clamp, as will be hereinafter fully described and claimed.

In the accompanying drawings, forming a part of this specification, and in which like characters of reference indicate corresponding parts, Figure 1 is a view in vertical longitudinal section through a length of pipe and a nipple, exhibiting the manner in which the clamp is combined therewith in forming a wipe-joint. Fig. 2 is a view in end elevation of one of the clamping-cones, showing more particularly the manner in which the cone is held against separation from the shank. Fig. 3 is a view in end elevation of an adjusting-nut used for moving a cone against a nipple or a section of pipe. Fig. 4 is a longitudinal sectional view exhibiting a modified form of the invention. Fig. 5 is a view in elevation of a part of the implement shown in Fig. 4.

Referring to the drawings and to Figs. 1, 2, and 3 thereof, N designates an ordinary pipe-nipple, P a section of pipe, and J a wipe-joint.

The purpose of the implement shown in Fig. 1 is to hold the nipple and pipe assembled while the joint is being formed and in such manner as positively to preclude the possibility of either the pipe or nipple having a movement relatively to each other while the formation of the joint is being effected. To secure this result, the implement shown is employed, which comprises a shank 1, a pair of cones 2 and 3, an adjusting-nut 4, and a cone-locking pin 5.

The shank 1 may be either a solid bar of metal, as shown in Fig. 1, or be a tube, as shown in Fig. 4, and is provided at one end with a transverse orifice 6 to receive the pin 5 and at its other end with threads 7 to be engaged by the nut 4, the periphery of which is fluted or knurled, as at 8, to facilitate turning. Each of the cones 2 and 3 is loosely mounted upon the shank, thus to reduce friction in operation to a minimum, and the cone 2 has combined with it an eye 9, with which is connected one end of a cord or chain 10, the other end of which is secured in an eye 11 of the pin. In order to reduce the friction between the nut and cone 3 to a minimum, a washer 12 is interposed between the parts, which is of less cross-diameter than either of them, and thus secures the object sought.

In using the implement described the pin 5 is detached from the shank, thus leaving the cone 2 free to be removed, and the shank is then inserted through the nipple and the pipe, which parts have previously been temporarily combined in the usual manner, after which the cone 2 is positioned upon the shank and the pin reinserted in the opening 6. The nut 4 is then turned, forcing the cone 3 into engagement with the nipple, as shown in Fig. 1, and drawing the cone 2 into engagement with the pipe, and when sufficient pressure has been applied to these parts the turning of the nut is discontinued. After the joint J is wiped in the usual manner the nut 4 is loosened, the pin then detached, and the cone 2 slipped from the shank, whereupon the latter may be removed from the pipe and nipple.

The form of invention thus described is adapted for holding together a nipple and a straight section of pipe or two nipples and a straight section of pipe; but to adapt the device for holding a section of pipe and an elbow-nipple or two nipples, one of which is of elbow shape and a straight section of pipe, the form of the invention shown in Fig. 4 is employed, wherein $N^2$ designates a straight nipple, $N^3$ the elbow-nipple, $P^2$ the pipe, and $J^2$ two wipe-joints employed in connecting the two nipples with the section of pipe.

The implement embodies a tubular shank 13, one end of which is threaded at 14 for the reception of a nut 15 similar to that shown in

Fig. 1 and the other end of which is provided with a series of longitudinal slits or incisions presenting resilient fingers 16. Disposed within the shank is a rod 17, one end of which is provided with a cone 18 and the other end with threads to be engaged by a nut 19, the cone 18 being disposed at that end of the shank at which the fingers are located. The shank has mounted upon it a cone 20 similar to the cone 3 in Fig. 1, between which and the nipple 15 is disposed a washer 21 for the same purpose as the washer 12. In using this form of the invention, after the nipples and pipe-sections are assembled, the nut 19 is loosened to permit the cone 18 to be moved exteriorly of the shank, after which the shank is inserted within the nipples and pipe and the fingers 16 are brought to a point in the elbow-nipple 3 adjacent to its bend. The nut 19 is then turned and imparts a longitudinal movement to the rod 17, which results in drawing the cone 18 into the shank and flaring the fingers and causing them to bite against the inner walls of the nipple. The nut 15 is then turned and forces the cone 20 into the nipple $N^2$, and thereby holds the nipples and pipe-section firmly assembled, after which the joints $J^2$ are formed in the usual manner and upon their completion the implement is removed.

It will be seen from the foregoing description that although the implements herein described are simple in character they will be thoroughly efficient in use for the purpose designed and will in a ready and practical manner secure the objects sought.

Having thus described the invention, what is claimed is—

1. An implement of the class described comprising a shank adapted to support a pipe or similar object and provided at one end thereof with a recess, a pair of cones loosely mounted on the shank for engagement with the opposite ends of said pipe, a removable locking-pin seated in the recess, and, means for adjusting the cones relatively along the shank.

2. An implement of the class described comprising a shank adapted to support a pipe or similar object and having one end thereof threaded and its opposite end provided with a recess, a pair of cones loosely mounted on the shank for engagement with the opposite ends of the pipe, a removable locking-pin seated in the recess, a connection between the locking-pin and the adjacent cone, a nut engaging the threaded end of the shank for adjusting both cones relatively along said shank, and an antifriction-washer interposed between the nut and the adjacent cone.

In testimony that I claim the foregoing as my own I have hereto affixed my signature in the presence of two witnesses.

JAMES C. POLSON.

Witnesses:
H. A. FOWLER,
F. V. ANDERSON.